(12) United States Patent
Takahashi et al.

(10) Patent No.: US 10,999,827 B2
(45) Date of Patent: May 4, 2021

(54) USER EQUIPMENT

(71) Applicant: NTT DOCOMO, INC., Tokyo (JP)

(72) Inventors: Hideaki Takahashi, Tokyo (JP); Hiromasa Umeda, Tokyo (JP); Kei Andou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/621,065

(22) PCT Filed: Jun. 1, 2018

(86) PCT No.: PCT/JP2018/021124
§ 371 (c)(1),
(2) Date: Dec. 10, 2019

(87) PCT Pub. No.: WO2018/230361
PCT Pub. Date: Dec. 20, 2018

(65) Prior Publication Data
US 2020/0205146 A1    Jun. 25, 2020

(30) Foreign Application Priority Data

Jun. 16, 2017    (JP) ................ 2017-119134

(51) Int. Cl.
*H04W 72/04* (2009.01)
*H04W 76/16* (2018.01)
*H04W 88/06* (2009.01)

(52) U.S. Cl.
CPC ....... *H04W 72/0413* (2013.01); *H04W 76/16* (2018.02); *H04W 88/06* (2013.01)

(58) Field of Classification Search
CPC ............... H04W 72/04; H04W 72/082; H04W 72/1215; H04W 76/20; H04W 76/16;
(Continued)

(56) References Cited

U.S. PATENT DOCUMENTS

2015/0103805 A1    4/2015  Jang et al.
2015/0223212 A1*   8/2015  Der Velde ............. H04W 76/15
                                                                370/329
(Continued)

FOREIGN PATENT DOCUMENTS

| JP | 2013-537770 A | 10/2013 |
|----|---------------|---------|
| KR | 20160132060 A | 11/2016 |
| WO | 2015171255 A1 | 11/2015 |

OTHER PUBLICATIONS

3GPP TSG RAN WG2 Meeting #87; R2-143534; "Details of IDC function for Dual Connectivity" CATT; Aug. 18-22, 2014; Dresden, Germany (2 pages).
(Continued)

*Primary Examiner* — Thanh C Le
(74) *Attorney, Agent, or Firm* — Osha Bergman Watanabe & Burton LLP

(57) ABSTRACT

To provide a technique for suppressing interference caused by inter-modulation distortion in dual connectivity between a plurality of radio communication systems using different RATs. An aspect of the present invention relates to user equipment including an interference indication generator that generates an interference indication including interfered carrier information that indicates a serving carrier that receives intra-device interference; and a transmitter-receiver that transmits the interference indication to a base station.

16 Claims, 16 Drawing Sheets

(58) Field of Classification Search
CPC ..... H04W 76/28; H04W 76/14; H04W 76/15; H04L 5/14
See application file for complete search history.

(56) References Cited

U.S. PATENT DOCUMENTS

2015/0327280 A1* 11/2015 Zhang .................. H04W 76/20
370/280
2016/0330676 A1* 11/2016 Thangarasa ........... H04W 76/14

OTHER PUBLICATIONS

3GPP TSG-RAN2 Meeting #89; R2-150228; "Clarification on affected/affecting frequencies of in-device coexistence" Samsung; Feb. 9-13, 2015; Athens, Greece (3 pages).
3GPP TR 38.804 V14.0.0; "3rd Generation Partnership Project; Technical Specification Group Radio Access Network; Study on New Radio Access Technology; Radio Interface Protocol Aspects (Release 14)" (57 pages).
3GPP TS 37.340 V0.1.1; "3rd Generation Partnership Project; Technical Specification Group Radio Access Network; Evolved Universal Terrestrial Radio Access (E-UTRA) and NR; Multi-connectivity; Stage 2 (Release 15)" (30 pages).
International Search Report issued in International Application No. PCT/JP2018/021124, dated Aug. 7, 2018 (4 pages).
Written Opinion issued in International Application No. PCT/JP2018/021124; dated Aug. 7, 2018 (4 pages).
Extended European Search Report issued in counterpart European Patent Application No. 18817582.2, dated Dec. 9, 2020 (10 pages).
Notification of Reason for Refusal issued in counterpart Korean Patent Application No. 10-2019-7035748, dated Dec. 21, 2020 (12 pages).
Notice of Reasons for Refusal issued in Japanese Application No. 2019-525309, dated Mar. 2, 2021 (5 pages).

\* cited by examiner

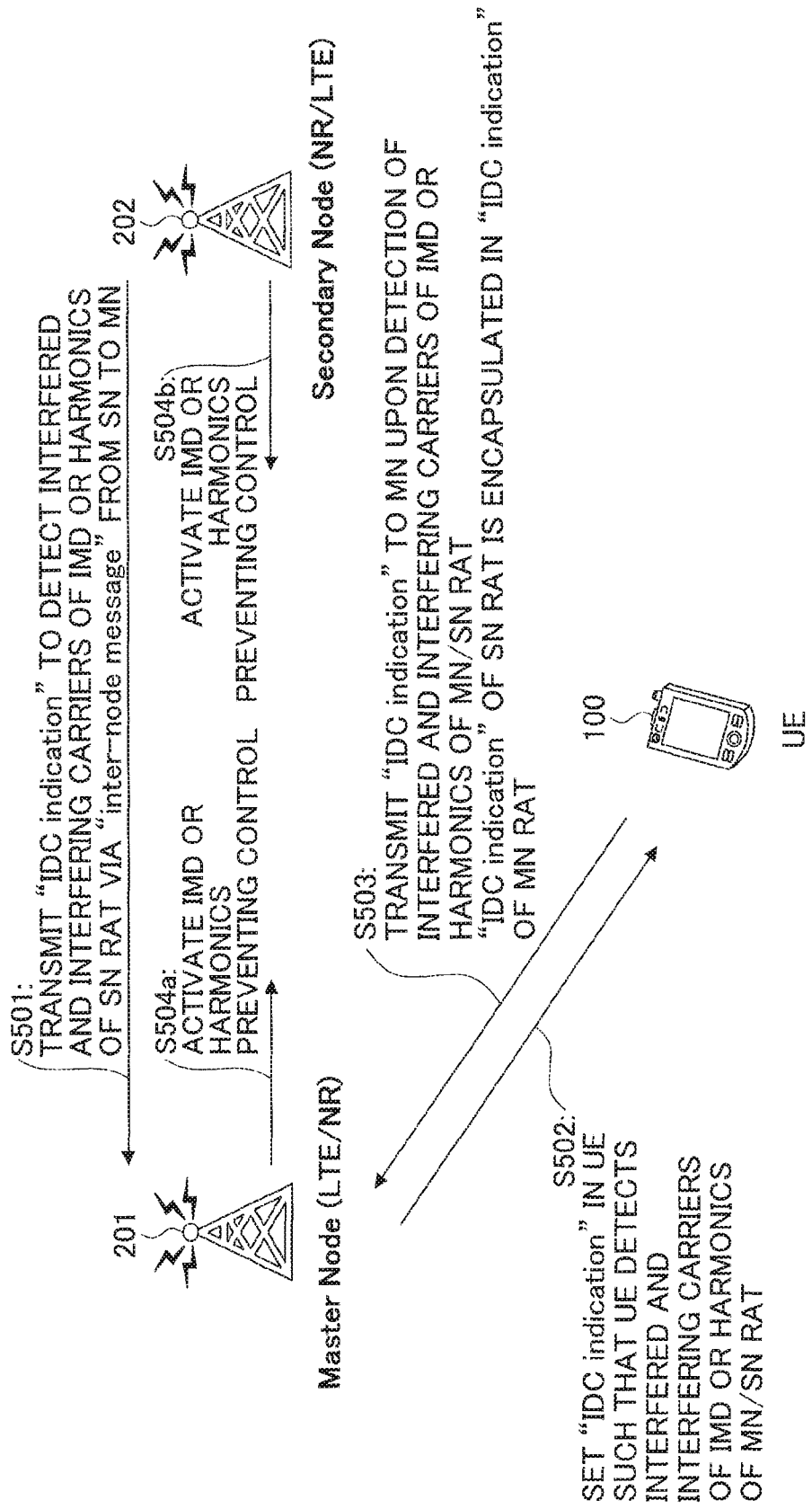

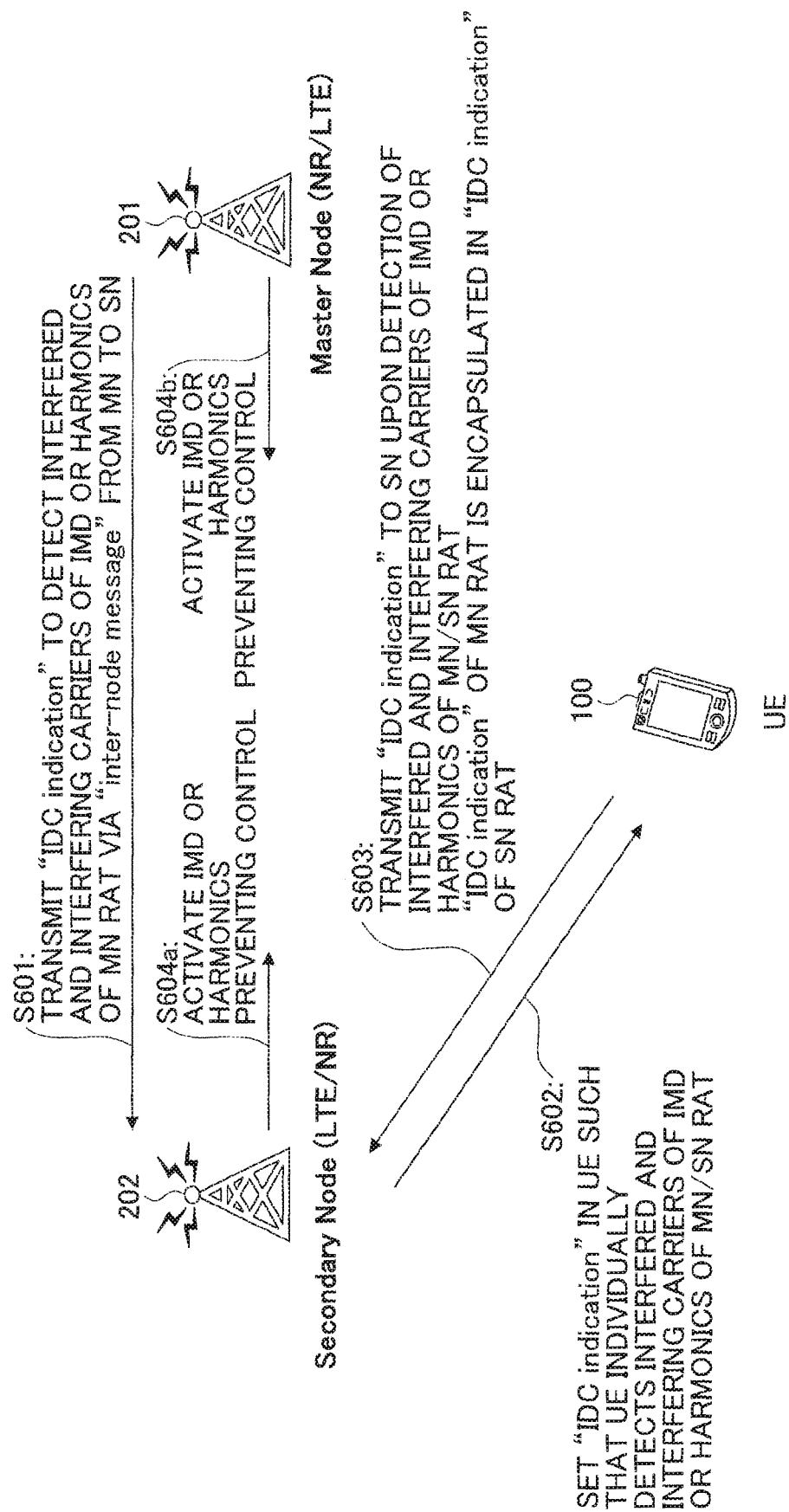

FIG.10

InDeviceCoexIndication message

```
-- ASN1START

InDeviceCoexIndication-v1310-IEs ::=    SEQUENCE {
    affectedCarrierFreqList-v1310       AffectedCarrierFreqList-v1310       OPTIONAL,
    affectedCarrierFreqCombList-r13     AffectedCarrierFreqCombList-r13     OPTIONAL,
    nonCriticalExtension                InDeviceCoexIndication-v15xy-IEs    OPTIONAL
}

InDeviceCoexIndication-v15xy-IEs ::=    SEQUENCE {
    mr-DC-AssistanceInfo-r15            SEQUENCE {
        affectedCarrierFreqCombList-r15 AffectedCarrierFreqCombList-r11     OPTIONAL,
        powerHeadroom-r15               PowerHeadroom-r15                   OPTIONAL,
        victimCarrierList-r15           VictimCarrierList-r15               OPTIONAL
    },
    nonCriticalExtension                SEQUENCE {}                         OPTIONAL
}

-- ASN1STOP
```

FIG.11

OtherConfig information element

```
-- ASN1START

IDC-Config-r11 ::=           SEQUENCE {
    idc-Indication-r11            ENUMERATED {setup}       OPTIONAL,   -- Need OR
    autonomousDenialParameters-r11    SEQUENCE {
        autonomousDenialSubframes-r11    ENUMERATED {n2, n5, n10, n15,
                                            n20, n30, spare2, spare1},
        autonomousDenialValidity-r11     ENUMERATED {
                                            sf200, sf500, sf1000, sf2000,
                                            spare4, spare3, spare2, spare1}
    }                             OPTIONAL,      -- Need OR
    ,
    [[ idc-Indication-UL-CA-r11       ENUMERATED {setup}     OPTIONAL    -- Cond idc-Ind
    ]],
    [[ idc-Indication-MR-DC-r15       ENUMERATED {setup}     OPTIONAL    -- Cond idc-Ind
    ]]
}

-- ASN1STOP
```

*idc-Indication-MR-DC*
The field is used to indicate whether the UE is configured to provide IDC indications for Multi-RAT Dual Connectivity using the *InDeviceCoexIndication* message.

FIG.12

InDeviceCoexIndication message

```
-- ASN1START

InDeviceCoexIndication-r15 ::=      SEQUENCE {
    criticalExtensions              CHOICE {
        c1                          CHOICE {
            inDeviceCoexIndication-r15      InDeviceCoexIndication-r15-IEs,
            spare3 NULL, spare2 NULL, spare1 NULL
        },
        criticalExtensionsFuture    SEQUENCE {}
    }
}

InDeviceCoexIndication-r11-IEs ::=  SEQUENCE {
    affectedCarrierFreqList-r15         AffectedCarrierFreqList-r15             OPTIONAL,
    tdm-AssistanceInfo-r15              TDM-AssistanceInfo-r15                  OPTIONAL,
    ul-CA-AssistanceInfo-r15            SEQUENCE {
        affectedCarrierFreqCombList-r11 AffectedCarrierFreqCombList-r15         OPTIONAL,
        victimSystemType-r15            VictimSystemType-r15
    }                                                                           OPTIONAL,
    mr-DC-AssistanceInfo-r15            SEQUENCE {
        affectedCarrierFreqCombListNR-r15   AffectedCarrierFreqCombListNR-r15   OPTIONAL,
        powerHeadroom-r15                   PowerHeadroom-r15                   OPTIONAL,
        victimCarrierListNR-r15             VictimCarrierListNR-r15             OPTIONAL,
    }                                                                           OPTIONAL,
    lateNonCriticalExtension            OCTET STRING                            OPTIONAL
    nonCriticalExtension                SEQUENCE {}
}

-- ASN1STOP
```

FIG.13

OtherConfig information element

```
-- ASN1START

IDC-Config-r11 ::=         SEQUENCE {
    idc-Indication-r11          ENUMERATED {setup}    OPTIONAL,        -- Need OR
    autonomousDenialParameters-r11   SEQUENCE {
        autonomousDenialSubframes-r11   ENUMERATED {n2, n5, n10, n15,
                                            n20, n30, spare2, spare1},
        autonomousDenialValidity-r11    ENUMERATED {
                                            sf200, sf500, sf1000, sf2000,
                                            spare4, spare3, spare2, spare1}
    }                           OPTIONAL,    -- Need OR
    ...,
    [[ idc-Indication-UL-CA-r11    ENUMERATED {setup}   OPTIONAL        -- Cond idc-Ind
    ]],
    [[ idc-Indication-MR-DC-r15    ENUMERATED {setup}   OPTIONAL        -- Cond idc-Ind
    ]]
}

-- ASN1STOP
```

FIG. 14

InDeviceCoexIndication message

```
-- ASN1START

InDeviceCoexIndication-v1310-IEs ::=    SEQUENCE {
    affectedCarrierFreqList-v1310       AffectedCarrierFreqList-v1310         OPTIONAL,
    affectedCarrierFreqCombList-r13     AffectedCarrierFreqCombList-r13       OPTIONAL,
    nonCriticalExtension                InDeviceCoexIndication-v15xy-IEs      OPTIONAL
}

InDeviceCoexIndication-v15xy-IEs ::=    SEQUENCE {
    mr-DC-AssistanceInfo-r15            SEQUENCE {
        affectedCarrierFreqCombListEUTRA-r15    AffectedCarrierFreqCombListEUTRA-r15   OPTIONAL,
        powerHeadroom-r15                       PowerHeadroom-r15                      OPTIONAL,
        victimCarrierListEUTRA-r15              VictimCarrierListEUTRA-r15             OPTIONAL,
        nr-InDeviceCoexInd-Container-r15        OCTET STRING                           OPTIONAL
    },
    nonCriticalExtension                SEQUENCE {}                                    OPTIONAL
}

-- ASN1STOP
```

FIG. 15

*InDeviceCoexIndication message*

```
-- ASN1START

InDeviceCoexIndication-r15 ::=     SEQUENCE {
    criticalExtensions                 CHOICE {
        c1                                 CHOICE {
            inDeviceCoexIndication-r15         InDeviceCoexIndication-r15-IEs,
            spare3 NULL, spare2 NULL, spare1 NULL
        },
        criticalExtensionsFuture           SEQUENCE {}
    }
}

InDeviceCoexIndication-r11-IEs ::= SEQUENCE {
    affectedCarrierFreqList-r15        AffectedCarrierFreqList-r15,
    tdm-AssistanceInfo-r15             TDM-AssistanceInfo-r15
    ul-CA-AssistanceInfo-r15           SEQUENCE {
        affectedCarrierFreqCombList-r11    AffectedCarrierFreqCombList-r15        OPTIONAL,
        victimSystemType-r15               VictimSystemType-r15
    }                                                                             OPTIONAL,
    mr-DC-AssistanceInfo-r15           SEQUENCE {
        affectedCarrierFreqCombListNR-r15  AffectedCarrierFreqCombListNR-r15      OPTIONAL,
        powerHeadroom-r15                  PowerHeadroom-r15                      OPTIONAL,
        victimCarrierListNR-r15            VictimCarrierListNR-r15                OPTIONAL,
        eutra-InDeviceCoexInd-Container-r15 OCTET STRING                          OPTIONAL
    }
    lateNonCriticalExtension           OCTET STRING                               OPTIONAL,
    nonCriticalExtension               SEQUENCE {}                                OPTIONAL
}

-- ASN1STOP
```

USER EQUIPMENT

TECHNICAL FIELD

The present disclosure relates to a radio communication system.

BACKGROUND ART

Currently, in the Third Generation Partnership Project (3GPP), specifications of a new radio communication system, which is called New Radio Access Technology (NR) system, have been developed, as a successor to the Long Term Evolution (LTE) system and the LTE-Advanced system.

In the NR system, as with the dual connectivity in the LTE system, the introduction of LTE-NR dual connectivity is being studied; in the LTE-NR dual connectivity, data that are split between a base station (eNB) of the LTE system and a base station (gNB) of the NR system are simultaneously transmitted and received by these base stations.

RELATED ART DOCUMENTS

Non-Patent Documents

[NON-PATENT DOCUMENT 1] 3GPP TR 38.804 V14.0.0 (2017 March)
[NON-PATENT DOCUMENT 2] 3GPP TS 37.340 V0.1.1 (2017 June)

SUMMARY OF THE INVENTION

Problem to be Solved by the Invention

In LTE-NR dual connectivity, inter-modulation distortion (IMD) and harmonics may occur in two or more uplink transmissions. In LTE-NR dual connectivity, inter-modulation distortion (IMD) and harmonics may occur in two or more uplink transmissions. In this case, the generated IMD and harmonics may intrude into a downlink reception band of an LTE component carrier or an NR component carrier in user equipment (UE), thereby causing interference (intra-device interference) within the user equipment. In particular, the NR system is generally susceptible to an effect of IMD because the NR system uses a wide bandwidth such as 28 GHz band.

Further, in the dual connectivity between a plurality of radio communication systems to which different RATS are applied, in addition to the dual connectivity between the LTE system and the NR system, IMD, harmonics, etc., may intrude into a reception band due to two or more uplink transmissions, thereby causing intra-device interference.

In view of the above-described problems, it is an object of the present invention to provide a technique for preventing intra-device interference in dual connectivity between a plurality of radio communication systems using different RATS.

Means for Solving the Problem

To solve the above-described problem, an aspect of the present invention relates to user equipment including an interference indication generator that generates an interference indication including interfered carrier information indicating a serving carrier that receives intra-device interference in dual connectivity between a first radio communication system and a second radio communication system; and a transmitter-receiver that transmits the interference indication to a base station.

Advantageous Effect of the Present Invention

According to the present invention, intra-device interference in dual connectivity between a plurality of radio communication systems using different RATs may be prevented.

BRIEF DESCRIPTION OF THE DRAWINGS

FIG. 8 is a schematic diagram illustrating an IDC indication setting procedure in LTE-NR dual connectivity according to an embodiment of the present invention;

FIG. 9 is a schematic diagram illustrating an IDC indication setting procedure in LTE-NR dual connectivity according to an embodiment of the present invention;

FIG. 10 is a diagram illustrating an example of signaling on an LTE side according to an embodiment of the present invention;

FIG. 11 is a diagram illustrating an example of signaling on an LTE side according to an embodiment of the present invention;

FIG. 12 is a diagram illustrating an example of signaling on an NR side according to an embodiment of the present invention;

FIG. 13 is a diagram illustrating an example of signaling on an NR side according to an embodiment of the present invention;

FIG. 14 is a diagram illustrating an example of signaling on an LTE side according to an embodiment of the present invention;

FIG. 15 is a diagram illustrating an example of signaling on an NR side according to an embodiment of the present invention.

EMBODIMENTS FOR CARRYING OUT THE INVENTION

The following describes embodiments of the present invention with reference to the accompanying drawings.

In the following embodiments, user equipment supporting dual connectivity between multiple radio communication systems utilizing different RATS, i.e., multi RAT dual connectivity, is disclosed.

Figure 1:
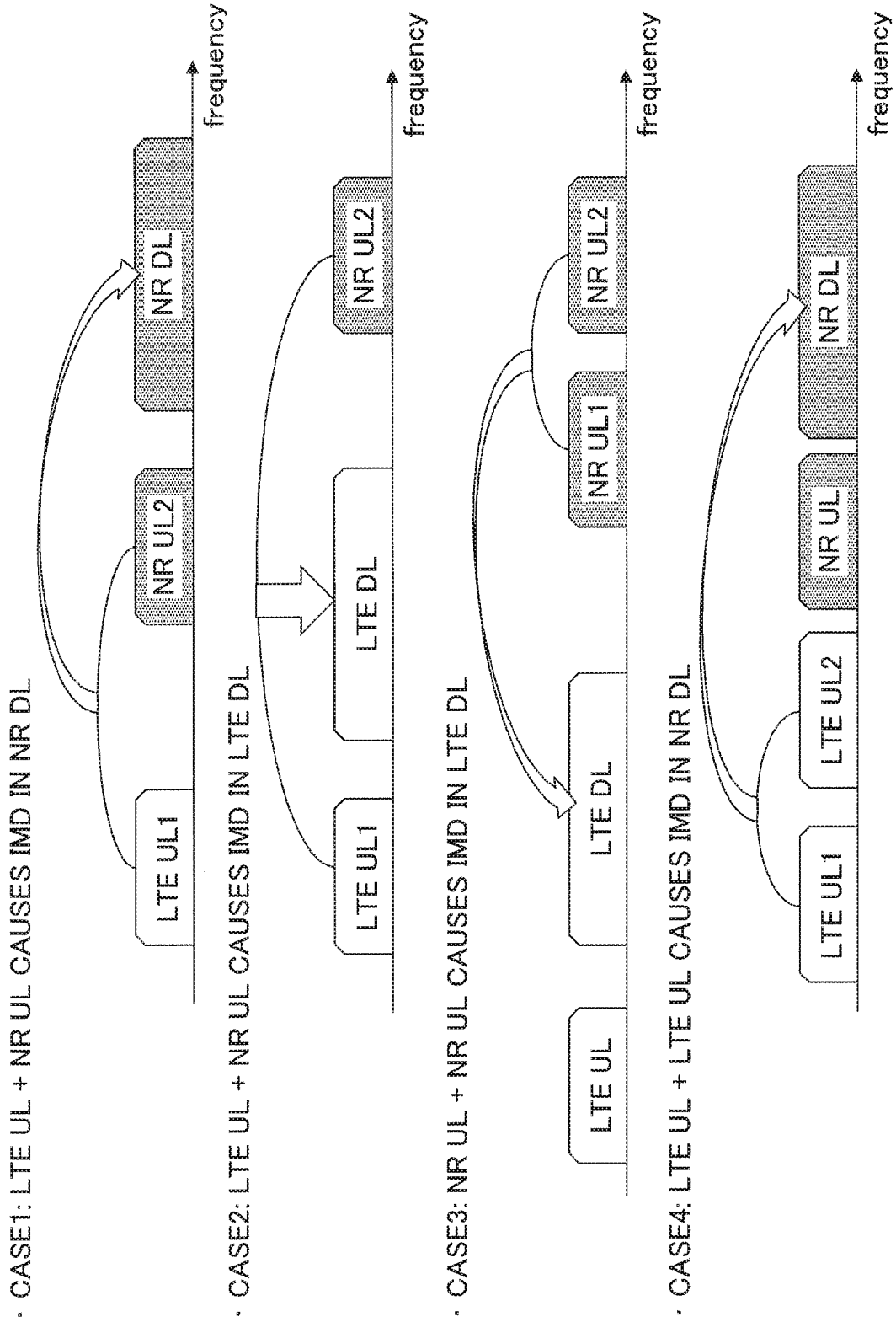
FIG. 1 is a diagram illustrating a combination of inter-modulation distortion (IMD) in LTE-NR dual connectivity.

Further, later-described embodiments will illustrate intra-device interference caused by inter-modulation distortion (IMD), harmonics, etc., in dual connectivity (LTE-NR dual connectivity) between an LTE system and an NR system. In the LTE-NR dual connectivity, typical four cases, such as those depicted in FIG. 1, where intra-device interference occurs, may be considered.

In case 1, in uplink dual connectivity (LTE UL1+NR UL2) by an uplink carrier (LTE UL1) of the LTE system and an uplink carrier (NR UL2) of the NR system, intermodulation distortion generated by a combination of LTE UL1 and NR UL2 and/or harmonics generated by transmission of LTE UL1 or NR UL2 intrudes into a downlink carrier (NR DL) of the NR system to cause intra-device interference in the NR DL.

In case 2, in uplink dual connectivity (LTE UL1+NR UL2) by an uplink carrier (LTE UL1) of the LTE system and an uplink carrier (NR UL2) of the NR system, intermodulation distortion generated by a combination of LTE UL1 and NR UL2 and/or harmonics generated by transmission of LTE UL1 or NR UL2 intrudes into a downlink carrier (LTE DL) of the LTE system to cause intra-device interference in the LTE DL.

In case 3, in uplink dual connectivity (LTE UL+NR UL1+NR UL2) by the uplink carrier (LTE UL) of the LTE system and two uplink carriers (NR UL1, NR UL2) of the NR system, intermodulation distortion generated by a combination of NR UL1 and NR UL2 and/or harmonics generated by transmission of NR UL1 or NR UL2 intrudes into a downlink carrier (LTE DL) of the LTE system to cause intra-device interference in the LTE DL.

In case 4, in uplink dual connectivity (LTE UL1+LTE UL2+NR UL) by two uplink carriers (LTE UL1, LTE UL2) of the LTE system and an uplink carrier (NR UL) of the NR system, intermodulation distortion due to a combination of LTE UL1 and LTE UL2 and/or harmonics due to transmission of LTE UL1 or LTE UL2 intrudes into the downlink carrier (NR DL) of the NR system to cause intra-device interference in the NR DL.

In order to prevent intra-device interference caused by intermodulation distortion, harmonics, etc., in the above-mentioned LTE-NR dual connectivity, user equipment according to the present disclosure transmits to a base station interference indication including interfered carrier information indicating a downlink serving carrier subject to interference due to intermodulation distortion, harmonics, etc. Upon receiving of the interference indication, the base station is enabled to identify a combination of uplink serving carriers causing intra-device interference in the carrier indicated by the interfered carrier information, and to execute interference preventing control on the user equipment, such as continuing of the uplink dual connectivity with a combination of carriers that do not cause interference in the interfered carrier.

Figure 2:
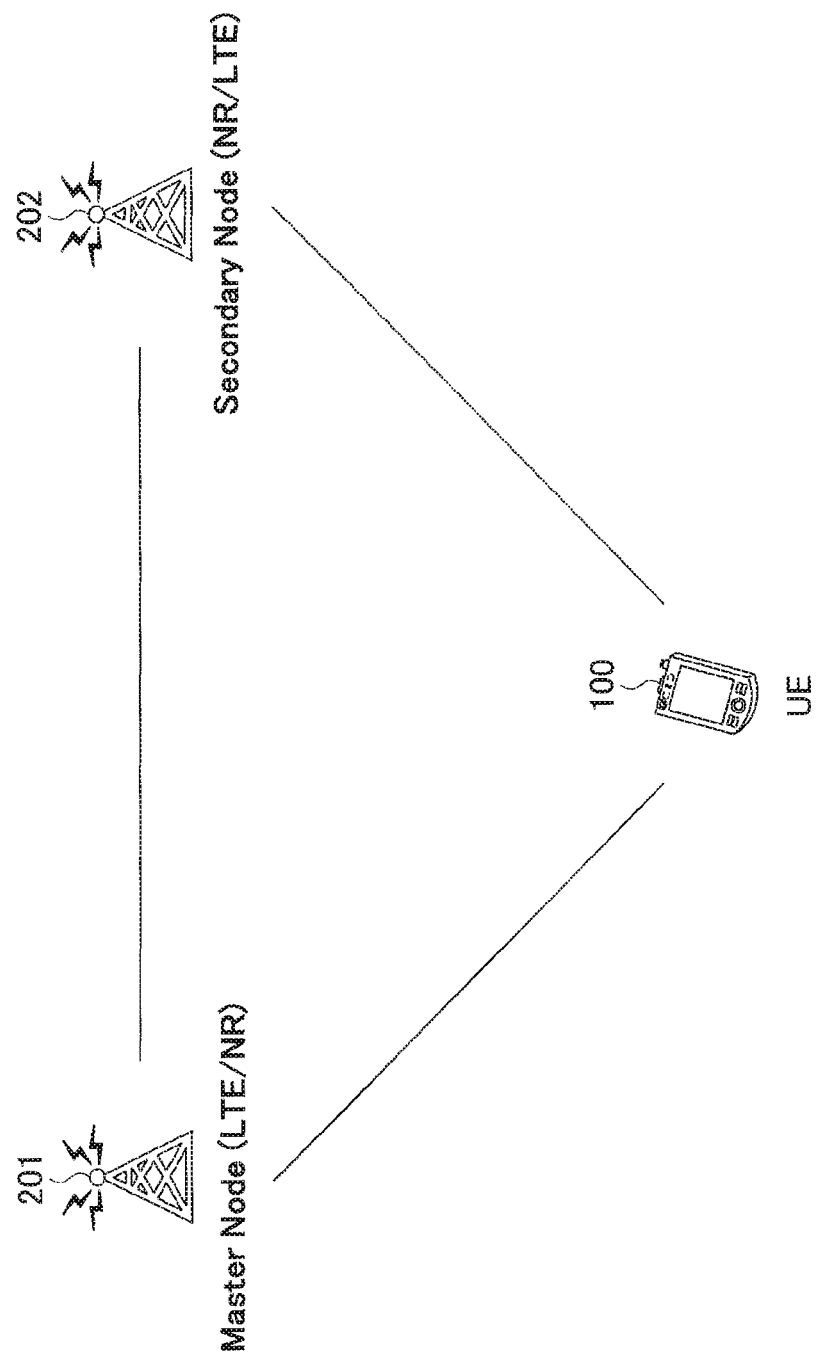
FIG. 2 is a schematic diagram illustrating a radio communication system according to an embodiment of the present invention.

First, a radio communication system according to an embodiment of the present invention will be described with reference to FIG. 2. FIG. 2 is a schematic diagram illustrating a radio communication system according to an embodiment of the present invention.

As illustrated in FIG. 2, user equipment 100 communicates with base stations 201 and 202 (hereinafter also referred to as a "base station 200") provided by an LTE system and an NR system, and also supports LTE-NR dual connectivity with the base station 201 acting as a master base station and the base station 202 acting as a secondary base station. That is, the user equipment 100 enables simultaneous transmission or reception with respect to the master base station 201 and the secondary base station 202, utilizing a plurality of component carriers provided by the master base station 201 and the secondary base station 202. In the illustrated embodiment, each of the LTE system and the NR system has only one base station; however, in general, each of the LTE system and the NR system may have a large number of base stations so as to cover service areas of the LTE system and the NR system.

Note that the following embodiments are described with respect to LTE-NR dual connectivity; however, user equipment according to the present disclosure is not limited to being applied to these embodiments. The user equipment may be applicable to dual connectivity between a plurality of radio communication systems using different RATs, i.e., multi-RAT dual connectivity, which may be readily understood by those skilled in the art.

Figure 3:
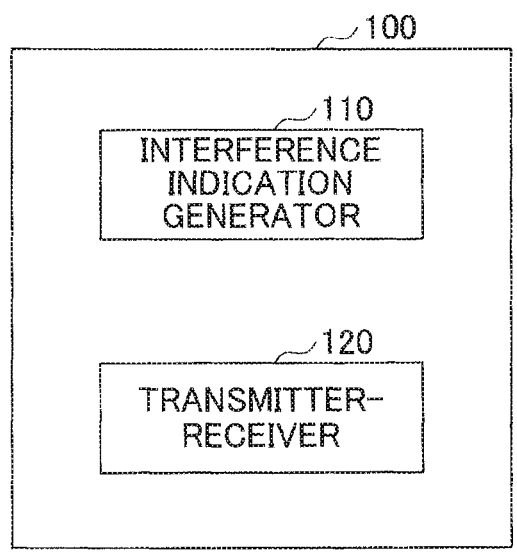
FIG. 3 is a block diagram illustrating a functional configuration of user equipment according to an embodiment of the present invention.

Next, user equipment according to an embodiment of the present invention will be described with reference to FIG. 3. FIG. 3 is a block diagram illustrating a functional configuration of user equipment according to an embodiment of the present invention.

As illustrated in FIG. 3, the user equipment 100 includes an interference indication generator 110 and a transmitter-receiver 120.

The interference indication generator 110 generates an interference indication including interfered carrier information indicating a serving carrier subject to intra-device interference in dual connectivity between a first radio communication system and a second radio communication system. Specifically, in the LTE-NR dual connectivity between the LTE system and the NR system, upon detection of interference (i.e., intra-device interference) in a downlink component carrier in the user equipment 100 due to inter-modulation distortion and harmonics, etc., caused by a combination of uplink component carriers (e.g., LTE UL+NR UL, LTE UL1+LTE UL2, NR UL1+NR UL2, etc., in the embodiment illustrated in FIG. 1), the interference indication generator 110 generates an interference indication ("InDeviceCoexIndication") including interfered carrier information indicating the interfered downlink component carrier.

The transmitter-receiver 120 transmits the generated interference indication to the base station 201 or 202. Specifically, when the transmitter-receiver 120 receives an interference report setting ("idc-Indication-MR-1" in "OtherConfig") for causing the user equipment 100 to report an interference indication indicating interfered carrier and/or interfering carriers of the intra-device interference, the interference indication generator 110 starts detection of intra-device interference due to intermodulation distortion, harmonics, etc., caused by a combination of uplink component carriers. Then, when the transmitter-receiver 120 transmits the generated interference indication to the base station 201 or 202, the base station 201 or 202 specifies the interfered carrier and the combination of the uplink component carriers causing intra-device interference in the interfered carrier, based on the received interference information in the received interference indication.

In this case, the base station 201 or 202 may hold, in advance, association information indicating pairing of a combination of uplink component carriers and a downlink component carrier subject to intra-device interference caused by the combination of uplink component carriers.

The base station 201 or 202 may refer to the association information to identify uplink component carriers corresponding to the interfered carrier reported from the user equipment 100 as interfering carriers, and may execute interference preventing control on the user equipment 100. For example, the base station 201 or 202 may reassign a frequency domain or a component carrier that does not intrude into the reported interfered carrier of intra-device interference to continue uplink dual connectivity, or may deactivate (deactivation) or deconfigure (deconfiguration) a secondary cell in the uplink dual connectivity. Alternatively, the base station 201 or 202 may reconfigure a primary cell and/or a secondary cell of different frequencies.

Thereafter, when the intra-device interference in the user equipment 100 is eliminated, the interference indication generator 110 generates, for example, an empty interference indication, and the transmitter-receiver 120 transmits the empty interference indication to the base station 201 or 202. Upon receiving of the empty interference indication, the base station 201 or 202 is enabled to determine that the intra-device interference in the user equipment 100 has been eliminated.

In one embodiment, the interfered carrier information may include cell identification information of a serving carrier subject to interference. For example, the cell identification information may be a serving cell index of the interfered serving carrier. Alternatively, the cell identification information may include a measurement object indicating information necessary for the user equipment 100 to measure the carrier, a center frequency of the carrier, any information specifying the center frequency (e.g., EARFCN (E-UTRA Absolute Radio Frequency Channel Number) in an LTE system, etc.). For example, the base station 201 or 202 acquires a center frequency and a bandwidth of each serving cell or each measurement object in advance, and identifies the center frequency and bandwidth of the serving cell or measurement object indicated by the received cell identification information. The base station 201 or 202 is enabled to identify a combination of uplink component carriers that cause intra-device interference in the interfered component carrier, based on the identified center frequency and bandwidth. According to the present embodiment, the base station 201 or 202 is enabled to identify interfering carriers from the interfered carrier information without transmission of the interfering carrier information by the user equipment 100.

Further, in one embodiment, the interfered carrier information may include a specific physical resource block (PRB), a physical resource element (PRE), and the like within the interfered carrier. That is, the interference indication generator 110 is enabled to indicate an interfered frequency domain with smaller granularity compared to the interfered carrier, and the base station 201 or 202 that has received the interfered carrier information is enabled to execute more appropriate interference preventing control.

In addition, in one embodiment, the interference indication may further include interfering carrier information indicating an interfering serving carrier that causes interference. That is, the interference indication generator 110 may further include interfering carrier information indicating a combination of interfering serving carriers that cause interference. More specifically, interfering carrier information indicates a combination of uplink component carriers that cause intra-device interference. For example, the interfering carrier information may be a measurement object of each uplink component carrier, a center frequency, any information specifying the center frequency (e.g., EARFCN in the LTE system, etc.), or the like.

Next, an interference indication setting procedure in the LTE-NR dual connectivity according to one embodiment of the present invention will be described with reference to FIGS. 4 to 5. In the present embodiment, a master base station 201 configures the settings of the user equipment 100 such that the user equipment 100 reports intra-device interference relating to both an LTE component carrier and an NR component carrier in the LTE-NR dual connectivity. The user equipment 100 detects interference associated with both an LTE component carrier and an NR component carrier, and the transmitter-receiver 120 transmits an interference indication (InDeviceCoexIndication (IDC) in the illustrated example) including interfered carrier information and/or interfering carrier information to the master base station 201.

Figure 4:
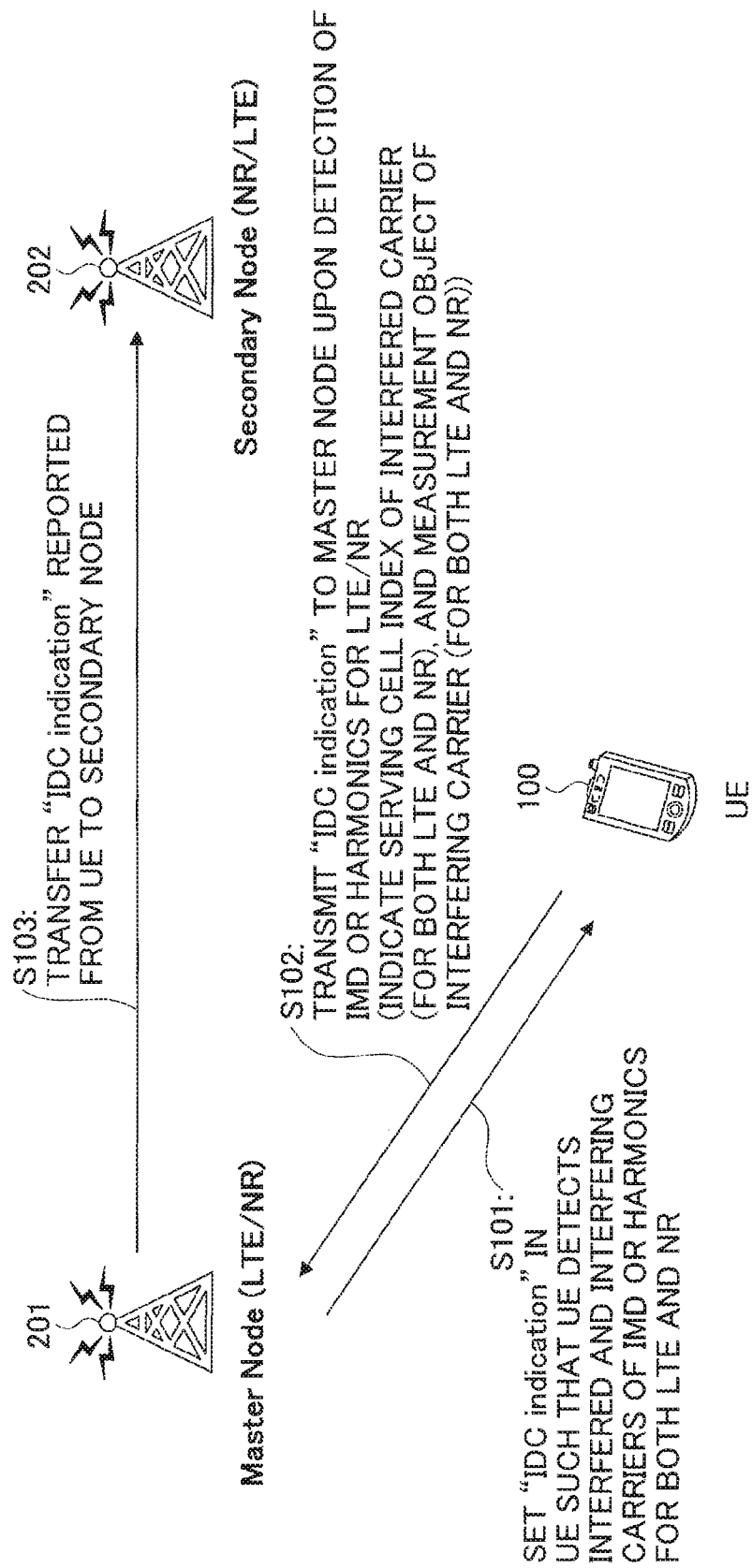
FIG. 4 is a schematic diagram illustrating an IDC indication setting procedure in LTE-NR dual connectivity according to an embodiment of the present invention.

FIG. 4 is a schematic diagram illustrating an IDC indication setting procedure in LTE-NR dual connectivity according to an embodiment of the present invention. The IDC indication setting procedure may be started in response to, for example, setting of LTE-NR dual connectivity. Note that the master base station 201 and the secondary base station 202 may belong to the LTE system and the NR system, respectively, or the master base station 201 and the secondary base station 202 may belong to the NR system and the LTE system, respectively.

As illustrated in FIG. 4, in step S101, the master base station 201 configures the settings of the user equipment 100 such that the user equipment 100 detects intra-device interference associated with both an LTE component carrier and an NR component carrier, and reports an interference indication indicating the detected interfered carrier and/or interfering carrier.

In step S102, upon detecting intra-device interference, the user equipment 100 transmits an interference indication indicating the detected interfered carrier and/or interfering carrier to the master base station 201. For example, the user equipment 100 may report a serving cell index of an interfered carrier and a measurement object of an interfering carrier to the master base station 201 as the interfered carrier information and the interfering carrier information, respectively. Note that as described above, when the master base station 201 holds, in advance, association information indicating pairing of a combination of uplink component carriers and a downlink component carrier subject to intra-device interference caused by the combination of uplink component carriers, the user equipment 100 may transmit only interfered carrier information to the master base station 201.

In step S103, the master base station 201 executes appropriate interference preventing control based on the received interference indication, and transfers the interference information received from the user equipment 100 to the secondary base station 202 to instruct the secondary base station 202 to perform appropriate interference preventing control.

Figure 5:
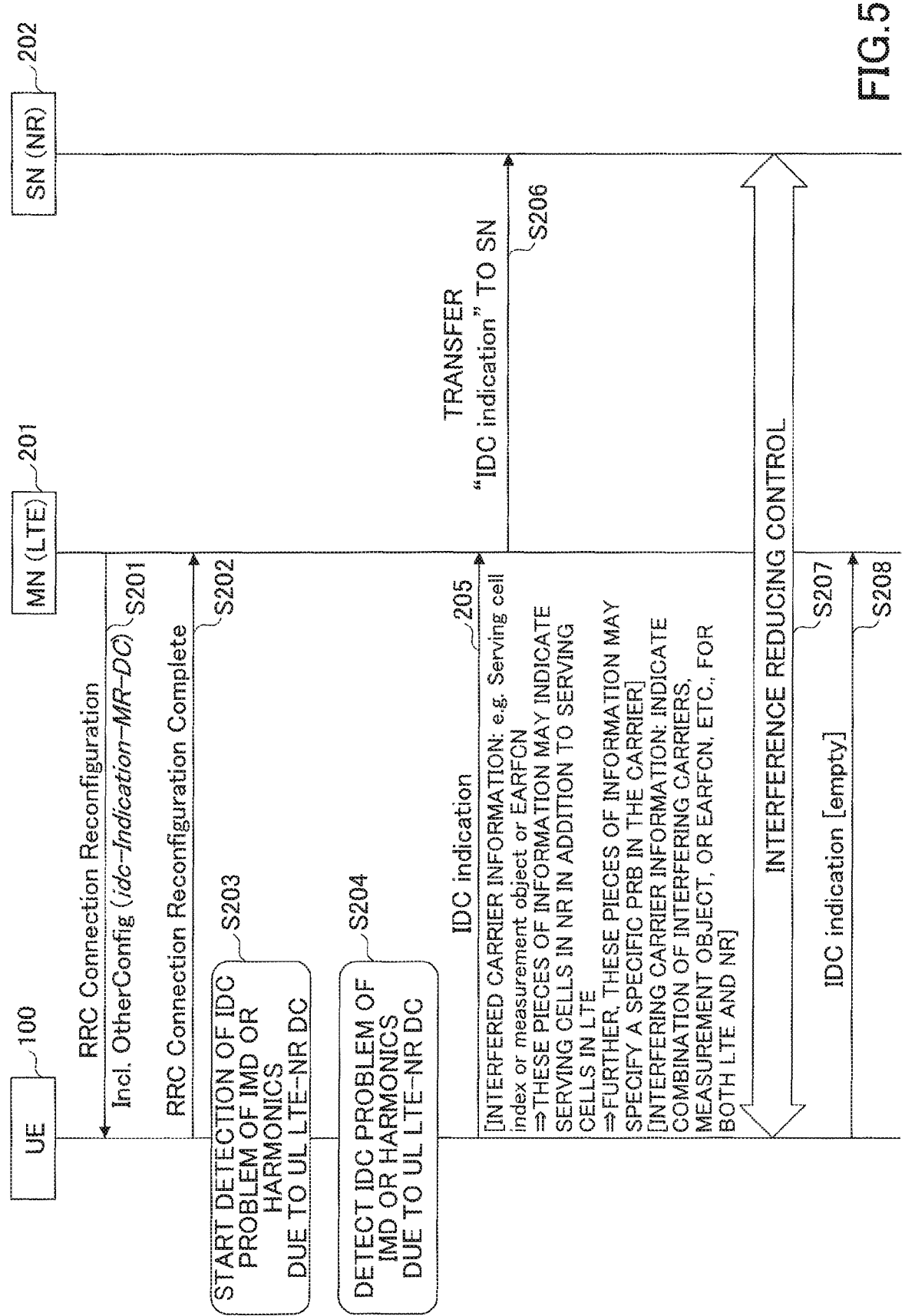
FIG. 5 is a sequence diagram illustrating an IDC indication setting procedure in LTE-NR dual connectivity according to an embodiment of the present invention.

FIG. 5 is a sequence diagram illustrating an IDC indication setting procedure in LTE-NR dual connectivity according to an embodiment of the present invention. The IDC indication setting procedure may be started in response to, for example, setting of LTE-NR dual connectivity. In the illustrated embodiment, the master base station (MN) 201 is configured to belong to the LTE system and the secondary base station (SN) 202 is configured to belong to the NR system. However, in other embodiments, the configuration is not limited to the above-described example; the master base station 201 may be configured to belong to the NR system and the secondary base station 202 may be configured to belong to the LTE system.

As illustrated in FIG. 5, in step S201, the master base station (MN) 201 transmits RRC Connection Reconfiguration to the user equipment 100, and configures the setting of the user equipment 100 such that the user equipment 100 reports an interference indication indicating an interfered carrier and/or an interfering carrier due to intra-device interference (OtherConfig (idc-Indication-MR-DC)).

In step S202, the user equipment 100 transmits RRC Connection Reconfiguration Complete indicating completion of the setting to the master base station 201.

In step S203, the user equipment 100 starts detection of intra-device interference due to a combination of uplink component carriers.

In step S204, the user equipment 100 detects intra-device interference due to a combination of uplink component carriers.

In step S205, the user equipment 100 transmits an interference indication including interfered carrier information (e.g., serving cell index, measurement object, EARFCN, etc.) indicating an interfered carrier to the master base station 201. In this embodiment, the master base station 201 belongs to the LTE system. Hence, the user equipment 100 reports not only an LTE component carrier subject to interference but also reports an NR component carrier to the master base station 201. The user equipment 100 may further include interfering carrier information (e.g., a serving cell index indicating a combination of interfering uplink component carriers, a measurement object, EARFCN, etc.) indicating interfering carriers in the interference indication. As with the interfered carrier information, the user equipment 100 reports not only an LTE component carrier that causes interference but also reports an NR component carrier to the master base station 201.

In step S206, the master base station 201 executes appropriate interference preventing control based on the received interference indication, and transfers the interference information received from the user equipment 100 to the secondary base station 202 to instruct the secondary base station 202 to perform appropriate interference preventing control.

In step S207, the master base station 201 and the secondary base station 202 execute appropriate interference preventing control on the user equipment 100.

In step S208, upon detection of elimination of the intra-device interference, the user equipment 100 reports that the intra-device interference has been eliminated to the master base station 201 by transmitting an empty IDC indication.

Next, an interference indication setting procedure in the LTE-NR dual connectivity according to one embodiment of the present invention will be described with reference to FIGS. 6 to 7. In the present embodiment, the master base station 201 and the secondary base station 202 each configure the settings of the user equipment 100, in the LTE-NR dual connectivity, such that the user equipment 100 reports the intra-device interference associated with the component carriers of a radio communication system to which the master base station 201 belongs and the intra-device interference associated with the component carriers of the radio communication system to which the secondary base station 202 belongs. In this case, the transmitter-receiver 120 transmits an interference indication indicating interfered carrier information and/or interfering carrier information on the radio communication system of the master base station 201 to the master base station 201, and also transmits an interference indication indicating interfered carrier information and/or interfering carrier information on the radio communication system of the secondary base station 202 to the secondary base station 202. For example, when the master base station 201 belongs to the LTE system and the secondary base station 202 belongs to the NR system, the user equipment 100 transmits an interference indication including the interfered carrier information and/or the interfering carrier information on the LTE component carrier to the master base station 201, and also transmits an interference indication including the interfered carrier information and/or the interfering carrier information on the NR component carrier to the secondary base station 202.

Figure 6:
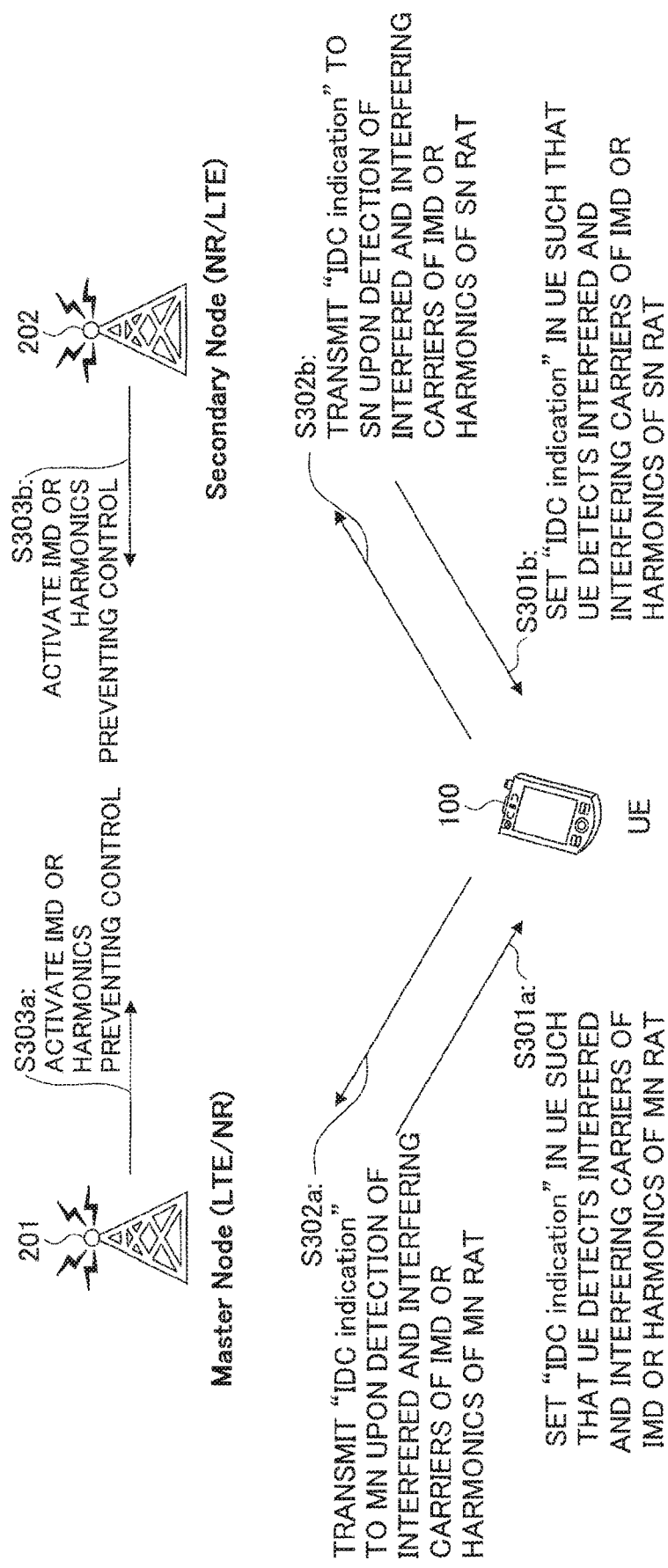
FIG. 6 is a schematic diagram illustrating an IDC indication setting procedure in LTE-NR dual connectivity according to an embodiment of the present invention.

FIG. 6 is a schematic diagram illustrating an IDC indication setting procedure in LTE-NR dual connectivity according to an embodiment of the present invention. The IDC indication setting procedure may be started in response to, for example, setting of LTE-NR dual connectivity. Note that the master base station 201 and the secondary base station 202 may belong to the LTE system and the NR system, respectively, or the master base station 201 and the secondary base station 202 may belong to the NR system and the LTE system, respectively.

As illustrated in FIG. 6, in step S301a, the master base station 201 configures the settings of the user equipment 100 such that the user equipment 100 detects intra-device interference associated with a component carrier of the radio communication system to which the master base station 201 belongs, and reports an interference indication indicating the detected interfered carrier and/or interfering carrier.

In step S301b, the secondary base station 202 configures the settings of the user equipment 100 such that the user equipment 100 detects intra-device interference associated with a component carrier of the radio communication system to which the secondary base station 202 belongs, and reports an interference indication indicating the detected interfered carrier and/or interfering carrier.

In step S302a, upon detection of intra-device interference associated with a component carrier of a radio communication system to which the master base station 201 belongs, the user equipment 100 transmits an interference indication indicating the detected interfered carrier and/or interfering carrier to the master base station 201. For example, the user equipment 100 may report a serving cell index of the interfered carrier and a measurement object of the interfering carrier to the master base station 201 as the interfered carrier information and the interfering carrier information, respectively. For example, when the master base station 201 belongs to the LTE system, the user equipment 100 transmits an interference indication indicating an interfered LTE component carrier and/or an interfering LTE component carrier to the master base station 201. Note that as described above, when the master base station 201 holds, in advance, association information indicating pairing of a combination of uplink component carriers and a downlink component carrier subject to intra-device interference caused by the combination of uplink component carriers, the user equipment 100 may transmit only interfered carrier information to the master base station 201.

In step S302b, upon detection of intra-device interference associated with a component carrier of a radio communication system to which the secondary base station 202 belongs, the user equipment 100 transmits an interference indication indicating the detected interfered carrier and/or interfering carrier to the secondary base station 202. For example, the user equipment 100 may report a serving cell index of the interfered carrier and a measurement object of the interfering carrier to the secondary base station 202 as the interfered carrier information and the interfering carrier information, respectively. For example, when the secondary base station 202 belongs to the NR system, the user equipment 100 transmits an interference indication indicating an interfered NR component carrier and/or an interfering NR component carrier to the secondary base station 202. Note that as described above, when the secondary base station 202 holds, in advance, association information indicating pairing of a combination of uplink component carriers and a downlink component carrier subject to intra-device interference caused by the combination of uplink component carriers, the user equipment 100 may transmit only interfered carrier information to the secondary base station 202.

In step S303a, the master base station 201 executes appropriate interference preventing control based on the received interference indication.

In step S303b, the secondary base station 202 performs indication to the secondary base station 202 for execution of appropriate interference preventing control based on the received interference information.

Figure 7:
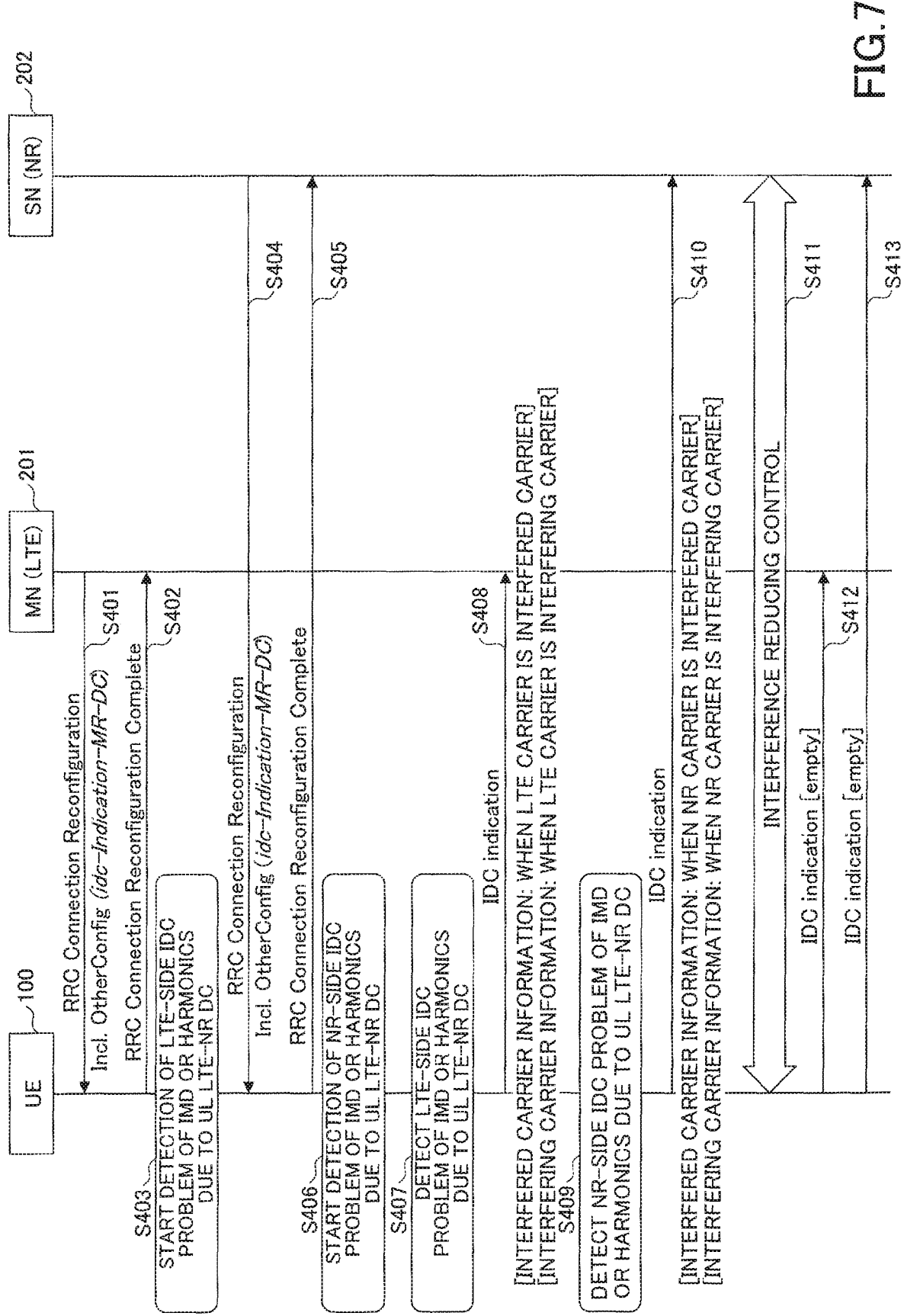
FIG. 7 is a sequence diagram illustrating an IDC indication setting procedure in LTE-NR dual connectivity according to an embodiment of the present invention.

FIG. 7 is a sequence diagram illustrating an IDC indication setting procedure in LTE-NR dual connectivity according to an embodiment of the present invention. The IDC indication setting procedure may be started in response to, for example, setting of LTE-NR dual connectivity. In the illustrated embodiment, the master base station (MN) 201 is configured to belong to the LTE system and the secondary base station (SN) 202 is configured to belong to the NR system. However, in other embodiments, the configuration is not limited to the above-described example; the master base station 201 may be configured to belong to the NR system and the secondary base station 202 may be configured to belong to the LTE system.

As illustrated in FIG. 7, in step S401, the master base station (MN) 201 transmits RRC Connection Reconfiguration to the user equipment 100, and configures the settings of the user equipment 100 such that the user equipment 100 reports an interference indication indicating an interfered carrier and/or an interfering carrier due to intra-device interference associated with an LTE component carrier (OtherConfig (idc-Indication-MR-DC)).

In step S402, the user equipment 100 transmits RRC Connection Reconfiguration Complete indicating completion of the setting to the master base station 201.

In step S403, the user equipment 100 starts detection of intra-device interference due to a combination of uplink component carriers relating to the LTE system.

In step S404, the secondary base station (SN) 202 transmits RRC Connection Reconfiguration to the user equipment 100, and configures the settings of the user equipment 100 such that the user equipment 100 reports an interference indication indicating an interfered carrier and/or an interfering carrier due to intra-device interference associated with an NR component carrier (OtherConfig (idc-Indication-MR-DC)).

In step S405, the user equipment 100 transmits RRC Connection Reconfiguration Complete indicating completion of the setting to the secondary base station 202.

In step S406, the user equipment 100 starts detection of intra-device interference due to a combination of uplink component carriers relating to the NR system.

In step S407, the user equipment 100 detects intra-device interference due to a combination of uplink component carriers relating to the LTE system.

In step S408, the user equipment 100 transmits an interference indication including interfered carrier information (e.g., serving cell index, measurement object, EARFCN, etc.) indicating an interfered LTE component carrier to the master base station 201. In addition, the user equipment 100 may further include interfering carrier information (e.g., a serving cell index indicating a combination of interfering uplink LTE component carriers, a measurement object, EARFCN, etc.) indicating an interfering LTE component carrier in the interference indication.

In step S409, the user equipment 100 detects intra-device interference due to a combination of uplink component carriers relating to the NR system.

In step S410, the user equipment 100 transmits an interference indication including interfered carrier information (e.g., serving cell index, measurement object, information specifying the measurement object, etc.) indicating an interfered NR component carrier to the secondary base station 202. In addition, the user equipment 100 may further include interfering carrier information (e.g., a serving cell index indicating a combination of interfering uplink NR component carriers, a measurement object, information specifying the measurement object, etc.) indicating an interfering NR component carrier in the interference indication.

In step S411, the master base station 201 and the secondary base station 202 execute appropriate interference preventing control on the user equipment 100 based on the received interference indication.

In step S412, upon detection of elimination of the intra-device interference in the LTE system, the user equipment 100 reports that the intra-device interference associated with an LTE component carrier has been eliminated to the master base station 201 by transmitting an empty IDC indication.

In step S413, upon detection of elimination of the intra-device interference in the NR system, the user equipment 100 reports that the intra-device interference associated with an NR component carrier has been eliminated to the secondary base station 202 by transmitting an empty IDC indication.

Next, an interference indication setting procedure in the LTE-NR dual connectivity according to one embodiment of the present invention will be described with reference to FIG. 8. In the present embodiment, the secondary base station 202 transmits to the master base station 201 an interference report setting (e.g., inter-node message by RRC or X2/Xn interface) for causing the user equipment 100 to report intra-device interference associated with a component carrier of the radio communication system to which the secondary base station 202 belongs. The master base station 201 includes the received interference report setting in the RRC Connection Reconfiguration, and configures the settings of the user equipment 100 such that the user equipment 100 reports the intra-device interference associated with a component carrier of the radio communication system to which the master base station 201 belongs in the RRC Connection Reconfiguration. In this case, the transmitter-receiver 120 transmits an interference indication (IDC) for the master base station 201 and an interference indication (IDC) for the secondary base station 202 to the master base station 201 by including the interference information indicating the interfered carrier information and/or the interfering carrier information on the radio communication system of the secondary base station 202 into the interference information indicating the interfered carrier information and/or the interfering carrier information on the radio communication system of the master base station 201.

That is, in the present embodiment, the interference indication for the master base station 201 and the interference indication for the secondary base station 202 are individually generated. The interference indication for the secondary base station 202 is encapsulated into the interference indication for the master base station 201, and the encapsulated interference indication is then transmitted to the secondary base station 202 via the master base station 201.

FIG. 8 is a schematic diagram illustrating an IDC indication setting procedure in LTE-NR dual connectivity according to an embodiment of the present invention. The IDC indication setting procedure may be started in response to, for example, setting of LTE-NR dual connectivity. The master base station 201 and the secondary base station 202 may belong to the LTE system and the NR system, respectively, or the master base station 201 and the secondary base station 202 may belong to the NR system and the LTE system, respectively.

As illustrated in FIG. 8, in step S501, the secondary base station 202 transmits to the master base station 201 an interference report setting (e.g., inter-node message by RRC or X2/Xn interface) for causing the user equipment 100 to report intra-device interference associated with a component carrier of the radio communication system to which the secondary base station 202 belongs.

In step S502, while the master base station 201 transmits the interference report setting received from the secondary base station 202 to the user equipment 100, the master base station 201 configures the settings of the user equipment 100 such that the user equipment 100 detects intra-device interference associated with a component carrier of the radio communication system to which the master base station 201 belongs, and reports an interference indication indicating the detected interfered carrier and/or interfering carrier.

In step S503, upon detection of intra-device interference associated with a component carrier of the radio communication system to which the master base station 201 belongs, the user equipment 100 generates an interference indication for the master base station 201 indicating the detected interfered carrier and/or interfering carrier. For example, when the master base station 201 belongs to the LTE system, the user equipment 100 generates an interference indication for the master base station 201 indicating an interfered LTE component carrier and/or an interfering LTE component carrier. Note that as described above, when the master base station 201 holds, in advance, association information indicating pairing of a combination of uplink component carriers and a downlink component carrier subject to intra-device interference caused by the combination of uplink component carriers, the user equipment 100 may generate an interference indication for the master base station 201 that only includes interfered carrier information.

Further, upon detection of intra-device interference associated with a component carrier of the radio communication system to which the secondary base station 202 belongs, the user equipment 100 generates an interference indication for the secondary base station 202 indicating the detected interfered carrier and/or interfering carrier. For example, when the secondary base station 202 belongs to the NR system, the user equipment 100 generates an interference indication for the secondary base station 202 indicating an interfered NR component carrier and/or an interfering NR component carrier. Note that as described above, when the secondary base station 202 holds, in advance, association information indicating pairing of a combination of uplink component carriers and a downlink component carrier subject to intra-device interference caused by the combination of uplink component carriers, the user equipment 100 may generate an interference indication for the secondary base station 202 that only includes interfered carrier information.

After generating the interference indication for the master base station 201 and the interference indication for the secondary base station 202, the user equipment 100 transmits the individually generated interference indication for the master base station 201 and individually generated interference indication for the secondary base station 202 to the master base station 201 by encapsulating or including the interference indication for the secondary base station 202 into the interference indication for the master base station 201.

In step S504a, the master base station 201 extracts the interference indication for the secondary base station 202 from the received interference indication for the master base station 201, and transfers the extracted interference indication for the secondary base station 202 to the secondary base station 202, while the master base station 201 executes appropriate interference preventing control based on the interference indication for the master base station 201.

In step S504b, the secondary base station 202 executes appropriate interference preventing control based on the received interference information for the secondary base station 202.

Next, an interference indication setting procedure in the LTE-NR dual connectivity according to one embodiment of the present invention will be described with reference to FIG. 9. In the present embodiment, the master base station 201 transmits to the secondary base station 202 an interference report setting (e.g., inter-node message by RRC or X2/Xn interface) for causing the user equipment 100 to report intra-device interference associated with a component carrier of the radio communication system to which the master base station 201 belongs. The secondary base station 202 includes the received interference report setting in the RRC Connection Reconfiguration, and configures the settings of the user equipment 100 such that the user equipment 100 reports the intra-device interference associated with a component carrier of the radio communication system to which the secondary base station 202 belongs in the RRC Connection Reconfiguration. In this case, the transmitter-receiver 120 transmits an interference indication (IDC) for the master base station 201 and an interference indication (IDC) for the secondary base station 202 to the secondary base station 202 by including the interference information indicating the interfered carrier information and/or the inter-fering carrier information on the radio communication system of the master base station 201 into the interference information indicating the interfered carrier information and/or the interfering carrier information on the radio communication system of the secondary base station 202. That is, in the present embodiment, the interference indication for the master base station 201 and the interference indication for the secondary base station 202 are individually generated. The interference indication for the master base station 201 is encapsulated in the interference indication for the secondary base station 202, and the encapsulated interference indication is then transmitted to the master base station 201 via the secondary base station 202.

FIG. 9 is a schematic diagram illustrating an IDC indication setting procedure in LTE-NR dual connectivity according to an embodiment of the present invention. The IDC indication setting procedure may be started in response to, for example, setting of LTE-NR dual connectivity. The master base station 201 and the secondary base station 202 may belong to the LTE system and the NR system, respectively, or the master base station 201 and the secondary base station 202 may belong to the NR system and the LTE system, respectively.

As illustrated in FIG. 9, in step S601, the master base station 201 transmits to the secondary base station 202 an interference report setting (e.g., inter-node message by RRC or X2/Xn interface) for causing the user equipment 100 to report intra-device interference associated with a component carrier of the radio communication system to which the master base station 201 belongs.

In step 602, while the secondary base station 202 transmits the interference report setting received from the master base station 201 to the user equipment 100, the secondary base station 202 configures the settings of the user equipment 100 such that the user equipment 100 detects intra-device interference associated with a component carrier of the radio communication system to which the secondary base station 202 belongs, and reports an interference indication indicating the detected interfered carrier and/or interfering carrier.

In step S603, upon detection of intra-device interference associated with a component carrier of the radio communication system to which the master base station 201 belongs, the user equipment 100 generates an interference indication for the master base station 201 indicating the detected interfered carrier and/or interfering carrier. For example, when the master base station 201 belongs to the LTE system, the user equipment 100 generates an interference indication for the master base station 201 indicating an interfered LTE component carrier and/or an interfering LTE component carrier. Note that as described above, when the master base station 201 holds, in advance, association information indicating pairing of a combination of uplink component carriers and a downlink component carrier subject to intra-device interference caused by the combination of uplink component carriers, the user equipment 100 may generate an interference indication for the master base station 201 that only includes interfered carrier information.

Further, upon detection of intra-device interference associated with a component carrier of the radio communication system to which the secondary base station 202 belongs, the user equipment 100 generates an interference indication for the secondary base station 202 indicating the detected interfered carrier and/or interfering carrier. For example, when the secondary base station 202 belongs to the NR system, the user equipment 100 generates an interference indication for the secondary base station 202 indicating an interfered NR component carrier and/or an interfering NR component carrier. Note that as described above, when the secondary base station 202 holds, in advance, association information indicating pairing of a combination of uplink component carriers and a downlink component carrier subject to intra-device interference caused by the combination of uplink component carriers, the user equipment 100 may generate an interference indication for the secondary base station 202 that only includes interfered carrier information.

After generating the interference indication for the master base station 201 and the interference indication for the secondary base station 202, the user equipment 100 transmits the individually generated interference indication for the master base station 201 and interference indication for the secondary base station 202 to the secondary base station 202 by encapsulating or including the interference indication for the master base station 201 into the interference indication for the secondary base station 202.

In step S604a, the secondary base station 202 extracts the interference indication for the master base station 201 from the received interference indication for the secondary base station 202, and transfers the extracted interference indication for the master base station 201 to the master base station 201, while the secondary base station 202 executes appropriate interference preventing control based on the interference indication for the secondary base station 202.

In step S604b, the master base station 201 executes appropriate interference preventing control based on the received interference information for the master base station 201.

Further, in one embodiment, the transmitter-receiver 120 may transmit an interference indication to the base station 201 or 202 providing an interfered serving carrier or an interfering serving carrier. Specifically, it is presumed that the interference indication is transmitted to the base station 201 or 202 that provides an interfered serving carrier. In this case, when the interfered serving carrier is an LTE component carrier and the base station 201 belongs to the LTE system, the transmitter-receiver 120 transmits the interference indication to the base station 201. Meanwhile, it is presumed that that the interference indication is transmitted to the base station 201 or 202 that provides an interfering serving carrier. In this case, when the interfering serving carrier is an NR component carrier and the base station 202 belongs to the NR system, the transmitter-receiver 120 transmits the interference indication to the base station 202.

Note that when a combination of the interfering uplink component carriers includes both an LTE component carrier and an NR component carrier (case 1 and case 2 in FIG. 1, etc.), the user equipment 100 may transmit the interference indication to both the master base station 201 and the secondary base station 202, or may transmit the interference indication to only one of the master base station 201 and the secondary base station 202.

Further, in one embodiment, the transmitter-receiver 120 may transmit an interference indication to the designated base station 201 and/or the base station 202. Specifically, a transmission destination of the interference indication may be specified by the base station 201 or 202 when the interference report setting is configured in OtherConfig within the RRC Connection Reconfiguration.

In addition, in one embodiment, the interference indication may further include the remaining transmission power or transmission power value. That is, upon detection of intra-device interference, the user equipment 100 may transmit power headroom or the actual transmission power value upon detection to the base station 201 and/or the base station 202. As a result, the base station 201 and/or the base station 202 is enabled to check the transmission power value that has caused the intra-device interference, and to control the user equipment 100 to lower the transmission power, thereby implementing interference prevention.

Moreover, in one embodiment, the interference indication may further include radio resources used in the uplink component carriers. That is, upon detection of intra-device interference, the user equipment 100 may transmit the radio resources used in the uplink component carriers upon detection to the base station 201 and/or the base station 202. For example, the radio resources may be a physical resource block (PRB), a physical resource element (PRE), or the like used in each interfering uplink component carrier that causes interference. As a result, the base station 201 and/or the base station 202 is enabled to check the frequency domain of each interfering carrier that has caused intra-device interference, and is enabled to implement interference prevention by allocating different frequency domains.

Next, an example of signaling according to an embodiment of the present invention will be described with reference to FIGS. 10 to 15.

The user equipment 100 may transmit the interference indication to the base station 201 or 202 belonging to the LTE system via "InDeviceCoexIndication message" as illustrated in FIG. 10. Note that the information element "affectedCarrierFreqComList" indicates interfering carrier information, and the information element "victimCarrierList" indicates interfered carrier information. Further, the information element "powerHeadroom" indicates the remaining transmission power or transmission power value.

The base station 201 or 202 belonging to the LTE system may set an information element "idc-Indication-MR-DC" in "OtherConfig" as illustrated in FIG. 11 to cause the user equipment 100 to detect intra-device interference and to report the interference indication.

The user equipment 100 may transmit the interference indication to the base station 201 or 202 belonging to the NR system via "InDeviceCoexIndication message" as illustrated in FIG. 12. Note that the information element "affectedCarrierFreqComListNR" indicates interfering carrier information, and the information element "victimCarrierListNR" indicates interfered carrier information. Further, the information element "powerHeadroom" indicates the remaining transmission power or transmission power value.

The base station 201 or 202 belonging to the NR system may set an information element "idc-Indication-MR-DC" in "OtherConfig" as illustrated in FIG. 13 to cause the user equipment 100 to detect intra-device interference and to report the interference indication.

Further, in the embodiment illustrated in FIGS. 8 and 9, the user equipment 100 may transmit the interference indication to the base station 201 or 202 belonging to the LTE system via "InDeviceCoexIndication message" as illustrated in FIG. 14. Note that the information element "affectedCarrierFreqComList" indicates interfering carrier information, and the information element "victimCarrierList" indicates interfered carrier information. Further, the information element "powerHeadroom" indicates the remaining transmission power or transmission power value. In addition, the information element "nr-Indevice CoexInd-Container" indicates the interfered carrier information and/or interfering carrier information of an NR component carrier to be transferred to the base station 202 or 201 belonging to the NR system.

The user equipment 100 may transmit the interference indication to the base station 201 or 202 belonging to the NR system via "InDeviceCoexIndication message" as illustrated in FIG. 15. Note that the information element "affectedCarrierFreqComListNR" indicates interfering carrier information, and the information element "victimCarrierListNR" indicates interfered carrier information. Further, the information element "powerHeadroom" indicates the remaining transmission power or transmission power value. In addition, the information element "eutra-IndeviceCoexInd-Container" indicates the interfered carrier information and/or interfering carrier information of an NR component carrier to be transferred to the base station 202 or 201 belonging to the LTE system.

The block diagrams used for the descriptions of the above-described embodiments represent blocks on a function-by-function basis. These functional blocks (components) are implemented by any combination of hardware and software. Here, a means for implementing each functional block is not particularly limited. Namely, each functional block may be implemented by one device that is physically or logically combined, or may be implemented by a plurality of devices that is obtained by directly or indirectly (e.g., using a wired line or a wireless link) connecting two or more devices that are physically or logically separated. A functional block may be implemented by combining software with the above-described one device or the above-described plurality of devices.

Figure 16:
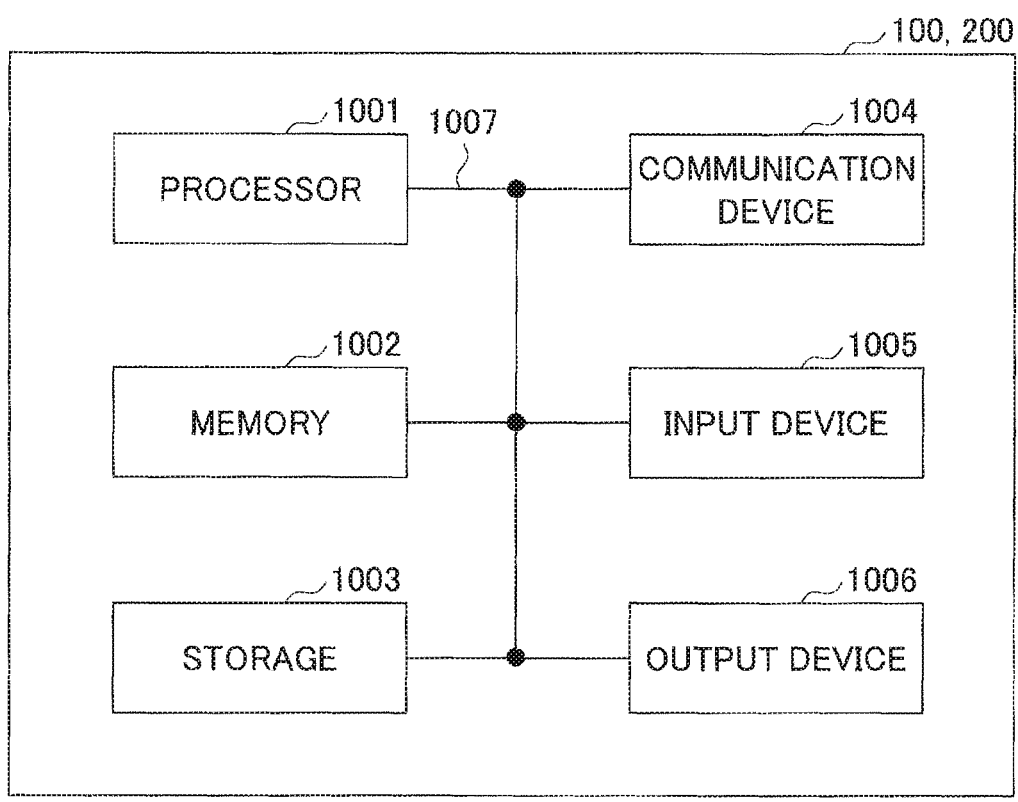
FIG. 16 is a block diagram illustrating a hardware configuration of user equipment and a base station according to an embodiment of the present invention.

For example, the user equipment 100 and the base station 200 according to the embodiment of the present invention may function as computers for executing a process of the radio communication method of the present invention. FIG. 16 is a block diagram illustrating a hardware configuration of each of the user equipment 100 and the base station 200 according to an embodiment of the present invention. Each of the above-described user equipment 100 and base station 200 may be physically configured as a computer device including a processor 1001, a memory 1002, a storage 1003, a communication device 1004, an input device 1005, an output device 1006, a bus 1007, etc.

Note that, in the following description, the term "device" can be read as a circuit, an apparatus, a unit, etc. The hardware configuration of each of the user equipment 100 and the base station 200 may be configured to include one or more of the respective devices illustrated, or may be configured not to include a part of the devices.

Each function of the user equipment 100 and the base station 200 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, each of the above-described components may be implemented by the processor 1001.

Additionally, the processor 1001 reads a program (program code), a software module and data from at least one of the storage 1003 and the communication device 1004 to the memory 1002, and executes various processes according to these. As the program, a program is used which causes a computer to execute at least a part of the operations described in the above-described embodiments. For example, a process by each component of each of the user equipment 100 and the base station 200 may be implemented by a control program stored in the memory 1002 and executed by the processor 1001, and another functional block may be similarly implemented. Although it is described that the above-described various processes are executed by a single processor 1001, the above-described various processes may be simultaneously or sequentially executed by two or more processors 1001. The processor 1001 may be implemented with one or more chips. Note that the program may be transmitted from a network via an electric communication line.

The memory 1002 is a computer readable recording medium, and the memory 1002 may be formed of at least one of a read-only memory (ROM), an erasable programmable ROM (EPROM), an electrically erasable programmable ROM (EEPROM), a random access memory (RAM), etc. The memory 1002 may be referred to as a register, a cache, a main memory (main storage device), etc. The memory 1002 can store executable programs (program codes), software modules, etc., that can be executed to implement the radio communication method according to the embodiment of the present invention.

The storage 1003 is a computer readable recording medium, and, for example, the storage 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The storage 1003 may be referred to as an auxiliary storage device. The above-described storage medium may be, for example, a database including the memory 1002 and/or the storage 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, each of the above-described components may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the memory 1002, are connected by a bus 1007 for communicating information. The bus 1007 may be formed of a single bus, or the bus 1007 may be formed of buses that are different between devices.

Furthermore, each of the user equipment 100 and the base station 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 1001 may be implemented with at least one of these hardware components.

Notification of information is not limited to the aspect/embodiment described in the present specification and may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB))), other signals, or by a combination thereof. Moreover, RRC signaling may be referred to as an RRC message, and, for example, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems extended on the basis of these systems.

In processing procedures, sequences, flowcharts, etc., of each embodiment/modified example described in the specification, the order may be changed provided that there is no contradiction. For example, for the methods described in the specification, the elements of the various steps are presented in an exemplary order and are not limited to a specific order presented.

The specific operations that are described in the specification to be performed by the base station 200 may be performed by their upper nodes in some cases. In a network formed of one or more network nodes including a base station, it is apparent that the various operations performed for communication with the terminal may be performed by the base station and/or a network node other than the base station (e.g., MME or S-GW may be considered, however, not limited to these). In the above description, a case is exemplified in which there is one network node other than the base station; however, there may be a combination of other network nodes (e.g., MME and S-GW).

Information, etc., may be output from a higher layer (or a lower layer) to a lower layer (a higher layer). Input and output may be performed through a plurality of network nodes.

Input and output information, etc., may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (Boolean: true or false), or may be made by comparison of numerical values (comparison with a predetermined value, for example).

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the description of the present specification is for the purpose of illustration and does not have any restrictive meaning to the present invention.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, etc., regardless of whether the software is referred to as software, firmware, middleware, microcode, hardware description language or other names.

Furthermore, software, instructions, etc., may be transmitted and received via a transmission medium. For example, when the software is transmitted from a website, server, or another remote source using at least one of wired technology (e.g., coaxial cable, fiber optic cable, twisted pair and digital subscriber line (DSL)) and wireless technology (infrared, radio, microwave, etc.), at least one of these wired and wireless technologies is included within the definition of the transmission medium.

Information, signals, etc., described in the present disclosure may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

Note that the terms described in this disclosure and the terms necessary for understanding of this specification may be replaced with terms having the same or similar meaning. For example, at least one of a channel and a symbol may be a signal (signaling). Furthermore, a signal may be a message. Furthermore, a component carrier (CC) may be referred to as a carrier frequency, a cell, etc.

The terms "system" and "network" as used in this disclosure are used interchangeably.

Furthermore, the information, parameters, etc., described in this specification may be represented by absolute values, may be represented as relative values from predetermined values, or may be represented by any other corresponding information. For example, the radio resource may be indicated by an index.

The names used for the above-described parameters are not for limiting in any point. Furthermore, mathematical expressions, etc., using these parameters may be different from those explicitly disclosed in this specification. Since the various channels (e.g., PUCCH, PDCCH, etc.) and information elements (e.g., TPC etc.) can be identified by suitable names, the various names assigned to these various channels and information elements are not for limiting in any point.

A base station can accommodate one or more (e.g., three) cells (also referred to as sectors). When the base station accommodates a plurality of cells, the entire coverage area of the base station can be divided into a plurality of smaller areas, and each smaller area may also provide communication services by base station subsystem (e.g., indoor small base station RRH: Remote Radio Head). The term "cell" or "sector" refers to a part or all of the coverage area of a base station and/or base station subsystem that provides communication service in this coverage. Furthermore, the terms "base station," "eNB," "cell," and "sector" may be used interchangeably in this specification. The base station may also be referred to as a fixed station, a NodeB, eNodeB (eNB), an access point, a femtocell, a small cell, etc.

A mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or it may also be called by some other suitable term.

The terms "determine (determining)" and "decide (deciding)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The terms "connected," "coupled," or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. Two elements, when used in this specification, can be considered to be mutually "connected" or "coupled by using one more or more wires, cables and/or printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS (Reference Signal), and may be referred to as a pilot (Pilot) according to applicable standards.

The expression "on the basis of" used in the present specification does not mean "on the basis of only" unless otherwise stated particularly. In other words, the expression "on the basis of" means both "on the basis of only" and "on the basis of at least".

Any reference to elements using names, such as "first" and "second," as used in this specification does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

"Means" in the configuration of each of the above-described devices may be replaced with "part," "circuit," "device," etc.

As long as "include," "including," and variations thereof are used in this specification or the claims, the terms are intended to be inclusive in a manner similar to the term "comprising." Furthermore, the term "or" used in the specification or claims is intended not to be an exclusive OR.

A radio frame may be formed of one or more frames in the time domain. In the time domain, each of the one or more of frames may be referred to as a subframe. A subframe may be formed of one or more slots in the time domain. A slot may be formed of one or more symbols (OFDM symbols, SC-FDMA symbols, etc.) in the time domain. Each of the radio frame, subframe, slot, and symbol represents a time unit for transmitting a signal. The radio frame, subframe, slot, and symbol may be called by respective different names. For example, in LTE system, the base station performs scheduling to allocate radio resources (a frequency bandwidth, transmission power, etc., that can be used by each mobile station) to each mobile station. The minimum time unit of scheduling may be referred to as a TTI (Transmission Time Interval). For example, one subframe may be referred to as a TTI, a plurality of consecutive subframes may be referred to as a TTI, or one slot may be referred to as a TTI. A resource block (RB) is a resource allocation unit in the time domain and the frequency domain, and may include one or more consecutive subcarriers in the frequency domain. Additionally, the resource block may include one or more symbols in the time domain, and may have a length of one slot, one subframe, or one TTI. Each of one TTI and one subframe may be formed of one or more resource blocks. The above-described configuration of the radio frame is merely an example, and the number of subframes included in the radio frame, the number of slots included in the subframe, the number of symbols and resource blocks included in the slot, and the number of subcarriers included in the resource block can be variously changed.

The embodiments of the invention are described above in detail. However, the invention is not limited to the above-described specific embodiments, and various modifications and changes may be made within a range of the gist of the present invention described in the claims.

This application is based upon and claims priority to Japanese Patent Application No. 2017-119134 filed on Jun. 16, 2017, and the entire content of Japanese Patent Application No. 2017-119134 is incorporated herein by reference.

DESCRIPTION OF REFERENCE SIGNS 100 user equipment
110 interference indication generator
120 transmitter-receiver
201, 202 base station

The invention claimed is:

1. A terminal comprising:
a processor that generates an interference indication including interfered carrier information indicating a serving carrier that receives intra-device interference, in dual connectivity between a first radio communication system and a second radio communication system; and
a transmitter that transmits the interference indication to a base station,
wherein the first radio communication system is a New Radio (NR) system, and the second radio communication system is a Long Term Evaluation (LTE) system.

2. The terminal according to claim 1, wherein the transmitter transmits the interference indication to a master base station in the dual connectivity.

3. The terminal according to claim 1, wherein the transmitter transmits, to a master base station, the interference indication indicating interfered carrier information on a radio communication system of a master base station in the dual connectivity and interfered carrier information on a radio communication system of a secondary base station.

4. The terminal according to claim 1, wherein, by including, in a first interference indication indicating interfered carrier information on a radio communication system of one base station in the dual connectivity, a second interference indication indicating interfered carrier information on a radio communication system of the other base station in the dual connectivity, the transmitter transmits, to the one base station, the first interference indication of the one base station and the second interference indication of the other base station.

5. The terminal according to claim 1, wherein the transmitter transmits the interference indication to a base station that provides an interfered serving carrier or an interfering serving carrier.

6. The terminal according to claim 1, wherein the interfered carrier information includes cell identification information of an interfered serving carrier.

7. The terminal according to claim 2, wherein the interfered carrier information includes cell identification information of an interfered serving carrier.

8. The terminal according to claim 3, wherein the interfered carrier information includes cell identification information of an interfered serving carrier.

9. The terminal according to claim 4, wherein the interfered carrier information includes cell identification information of an interfered serving carrier.

10. The terminal according to claim 5, wherein the interfered carrier information includes cell identification information of an interfered serving carrier.

11. The terminal according to claim 1, wherein the interference indication further includes information indicating a system that causes the interference.

12. The terminal according to claim 2, wherein the interference indication further includes information indicating a system that causes the interference.

13. The terminal according to claim 3, wherein the interference indication further includes information indicating a system that causes the interference.

14. The terminal according to claim 4, wherein the interference indication further includes information indicating a system that causes the interference.

15. The terminal according to claim 5, wherein the interference indication further includes information indicating a system that causes the interference.

16. The terminal according to claim 6, wherein the interference indication further includes information indicating a system that causes the interference.

* * * * *